Aug. 14, 1962  A. G. WESTERMAN  3,049,223
SLIDE GATE FOR VIBRATORY CONVEYORS
Filed Oct. 21, 1959  2 Sheets-Sheet 1
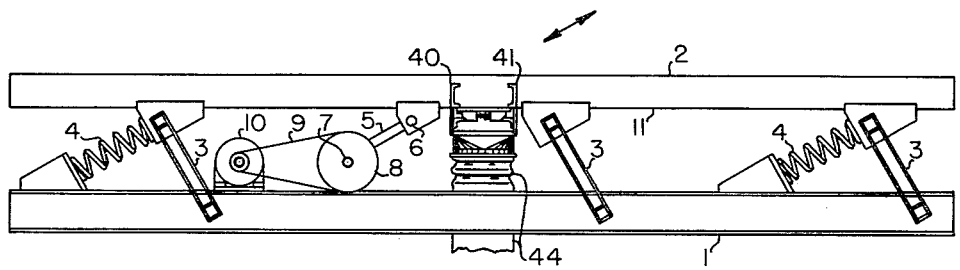
Fig. I
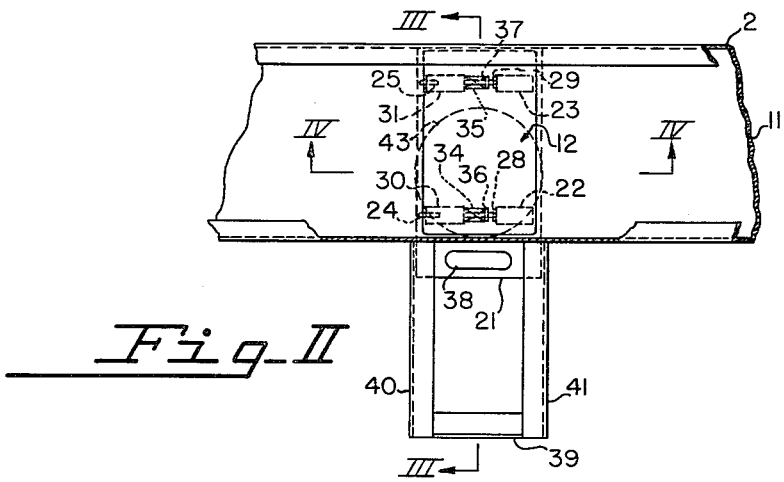
Fig. II
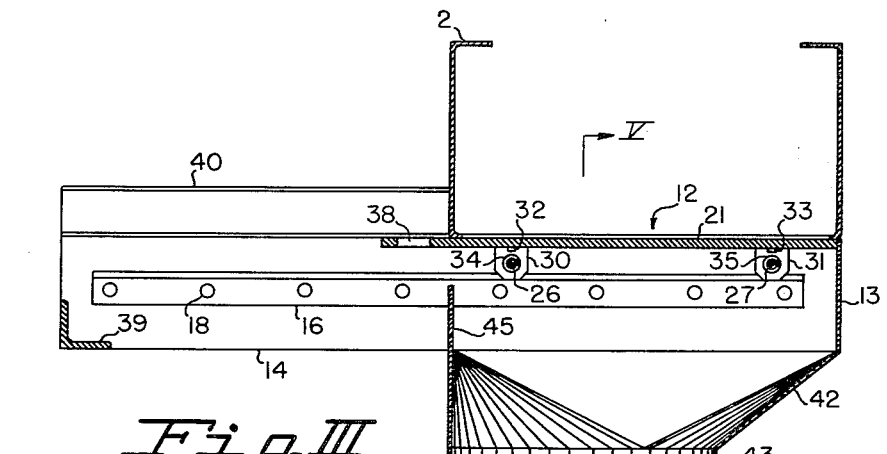
Fig. III
INVENTOR.
ALVIN G. WESTERMAN
BY
Marshall, Marshall & Yeasting
ATTORNEYS

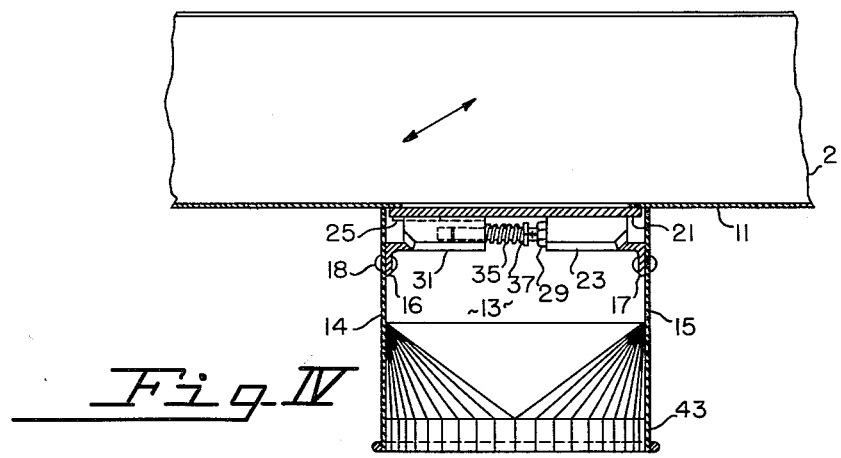
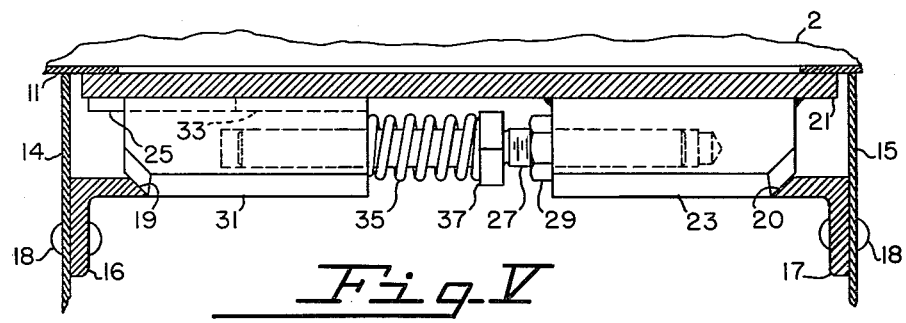
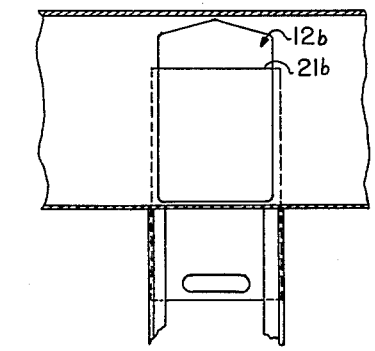
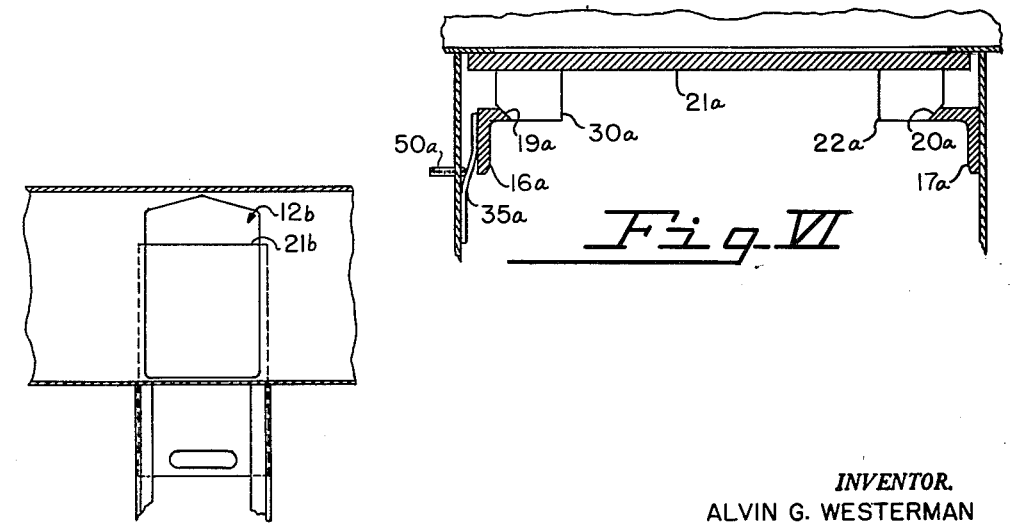
INVENTOR.
ALVIN G. WESTERMAN

United States Patent Office 3,049,223
Patented Aug. 14, 1962

3,049,223
SLIDE GATE FOR VIBRATORY CONVEYORS
Alvin G. Westerman, Louisville, Ky., assignor, by mesne assignments, to Chain Belt Company, Milwaukee, Wis., a corporation of Wisconsin
Filed Oct. 21, 1959, Ser. No. 847,787
9 Claims. (Cl. 198—220)

This invention relates to vibratory conveyors of the type in which a trough or conduit is vibrated so as to convey granular or pulverulent material longitudinally of the vibratory conduit. Such conveyors are usually designed to receive material adjacent one end of the vibratory conduit and discharge the material from the other end of the vibratory conduit. In some instalaltions, however, provision must be made for discharging material at one or more places intermediate the ends of the vibratory conduit. Heretofore such intermediate discharge provisions have been made by forming openings in the bottom of the vibratory conduit and equipping the conduit at the openings with gates which were hinged to be swung open or shut.

Because of the intense vibration to which the troughs or conduits of vibratory conveyors are subjected hinged gates are very noisy and their hinges are subjected to rapid wear. Furthermore hinged gates are difficult to fit snuggly enough to prevent excessive leakage of granular and pulverulent materials and to keep from shaking loose and permitting material to escape through cracks thus formed while the conveyor is being vibrated.

It is an object of this invention to provide a gate and means for mounting the gate to open and close by sliding across an opening in a vibratory conveyor conduit, the structure being comparatively noiseless during vibration.

It is a further object to provide a gate and means for mounting such gate upon a vibratory conveyor conduit so that the gate will not be shaken loose and allow the escape of material through cracks thus formed between the gate and the vibratory conduit.

It is a further object to provide a gate and means for so mounting the gate upon a vibratory conveyor conduit that a snug but non-binding fit is automatically maintained therebetween.

A further object of the invention is to provide a gate and means for mounting the gate upon a vibratory conveyor conduit in which wear does not affect the tight closure of the gate.

A further object is to provide a gate and means for mounting the gate having the hereinabove mentioned advantages and which is easily manipulated.

And still a further object is to provide a sturdy gate and gate mounting means which are economical to manufacture and apply.

Other objects and advantages of the invention will appear upon perusal of the following description and upon inspection of the accompanying drawings, in which:

FIG. 1 is a side elevational view of a vibratory conveyor incorporating this invention;

FIG. II is a plan view, partly in section and on an enlarged scale, of a part of the conveyor illustrated in FIG. I;

FIG. III is a vertical section, on a further enlarged scale, as seen from the line III—III of FIG. II;

FIG. IV is a vertical section on the same scale as FIG. III as seen from the line IV—IV of FIG. II;

FIG. V is a fragmentary view on a still further enlarged scale partly in section taken as indicated by the arrows V—V of FIG. III;

FIG. VI is a fragmentary view on a scale smaller than that of FIG. V showing a modification; and FIG. VII is a fragmentary plan view on a scale comparable to that of FIG. II showing another modification.

These drawings and the following description illustrate and describe a preferred form of a slide gate for vibratory conveyors but they are not intended to limit the scope of the invention.

Referring to the drawings in detail a base 1 of a vibratory conveyor supports a trough or conduit 2 by means of a series of flexible links 3 and a plurality of helical springs 4, which links and springs permit the conduit 2 to vibrate in the direction indicated by the double pointed arrow above FIG. I in a manner that is well known in the art.

Any desired means may be employed to vibrate the conduit 2. For the purpose of illustration the vibrating means is shown as consisting of a link 5 with a pivotal connection 6 to the conduit 2 at one end, the other end of the link 5 being connected to a crank shaft or cam shaft 7 upon which is fixed a pulley 8 that is turned by a belt 9 from a motor 10.

The conduit 2 has a flat bottom 11 with one or more openings 12 therein, the openings being located at places intermediate the ends of the conduits 2 where it may be desired upon occasion to discharge material from the conveyor trough.

Welded or otherwise rigidly secured to the rear side of the trough or conduit 2 is a back wall 13 that extends downwardly along the rear edge of the opening 12, and extending downwardly transversely of the trough 2 are a pair of side walls 14 and 15. The side walls 14 and 15 project forwardly for a distance exceeding the width of the trough 2 and support angleform rails 16 and 17 which may be formed of hard brass and which are rigidly secured as by rivets 18, brazing, or otherwise, to the side walls 14 and 15. The rails 16 and 17 have beveled edges 19 and 20 (FIG. V).

A slide gate body 21 consists of a rectangular plate somewhat larger in area than the opening 12 upon the lower side of which is fixed, preferably by welding, a pair of immovable blocks 22 and 23 and a pair of keys 24 and 25. The immovable blocks 22 and 23 have threaded bores opening toward the center of the plate and receiving guide rods 26 and 27, one end of each of which is threaded or screwed into one of the threaded bores and locked in place by a lock nut 28 or 29.

The unthreaded smooth ends of the guide rods 26 and 27 extend into smooth bores in movable blocks 30 and 31 which have keyways 32 and 33 that receive and slide upon the keys 24 and 25 that are welded to the bottom of the gate body 21. Surrounding the unthreaded smooth ends of the guide rods 26 and 27 are expansive helical springs 34 and 35 which are compressed between the movable blocks 30 and 31 and shoulders 36 and 37 on the guide rods 26 and 27.

The ends of the immovable blocks 22 and 23 and the movable blocks 30 and 31 are beveled to conform to and slide upon the beveled edges 19 and 20 of the angleform rails 16 and 17. Hence, when the gate is mounted beneath the bottom of the trough 2, the blocks being pushed against the rails lift the gate upwardly and hold it tightly but slidably against the bottom 11 of the trough 2 around the margin of the opening 12 in the bottom of the trough.

To facilitate the opening and closing of the gate the gate body is provided with a hand hole 38. For strengthening and stiffening the side walls 14 and 15 they are connected at their forward ends by an angle piece 39, and channel shaped supports 40 and 41 are welded along their upper edges and to the trough 2.

As is shown in FIGS. III and IV a funnel 42 having a round lower end 43 and a rectangular upper end merging with the lower edges of the back wall 13 and side walls 14 and 15 extends downwardly from the side walls to guide material into a round chute 44 which may be made of fabric and may be attached to the round end 43 by means of a ring or other means. A front wall 45 may extend upwardly from the forward edge of the funnel 42 to a height at which it will be cleared by the gate structure as the gate structure is opened and closed.

FIG. VI shows a modification in which one of two guide rails 16a—17a, instead of being immovably mounted, is resiliently mounted and has its beveled edge 19a yieldably pressed against a conforming beveled edge that is fixed with respect to the gate body 21a. The conforming beveled edge may be formed upon the gate body 21a itself or upon a rail or block 30a that is fixed to the gate body 21a. The rail 17a and its beveled edge may be fixed rather than resiliently mounted and the beveled edges that conform to and slide upon the beveled edge 29a may be, and preferably are, fixed with respect to the gate body 21a.

In order to prevent substantial vertical movement of the rail 16a while permitting horizontal movement thereof, the rail 16a is fixed upon the ends of two or more upright leaf springs 35a. Adjusting screws 50a are provided for varying the horizontal force exerted upon the rail 16a and the consequent force with which the gate body 21a is pressed upwardly.

The discharge opening 12b shown in FIG. VII has a sloping rear end under which the straight rear edge of the gate body 21b is slid to close the gate. If the rear end of the opening were parallel to the straight rear edge of the gate body the rear edge of the gate body might bow upwardly and catch on the parallel rear end of the discharge opening when the straight rear edge of the gate body reached the parallel rear end of the opening. With the rear end of the opening sloped however, the rear edge of the gate would first reach the sloped rear end of the opening where the rear edge is held down by the side of the opening, and would be guided by shear-like action from side to center, thus avoiding liability to catch.

The objects of the invention are well accomplished by the mechanism hereinabove described and illustrated by the accompanying drawings. It is to be understood however, that the invention encompasses such variations and modifications of the mechanism as fall within the spirit and scope of the subjoined claims.

Having described the invention, I claim:

1. In a vibratory conveyor, in combination, a conveyor conduit, means for vibrating said conveyor conduit in a direction to convey material along said conveyor conduit, said conveyor conduit having a substantially flat bottom with a discharge opening therein, a flat gate body, means for mounting said gate body to be slid into closed, open or partly open position, said means comprising a pair of parallel rails carried by said conduit in spaced relation to its lower surface and parallel to the path of said body, shoes having beveled surfaces carried by said gate body and engaging the rails to urge the body against said flat bottom, and resilient means acting parallel to the surface of the gate and normal to its path for maintaining pressure between the beveled surfaces of said shoes and said rails carried by said conduit when said gate body is in closed, open or partly open position whereby said gate body in all positions thereof is pressed against said substantially flat bottom of said conveyor conduit.

2. In a vibratory conveyor, in combination, a conveyor conduit, means for vibrating said conveyor conduit in a direction to convey material along said conveyor conduit, said conveyor conduit having a substantially flat bottom with a discharge opening therein, a flat gate body, means for mounting said gate body to be slid into opening obstructing position, said means comprising a pair of generally parallel rails having beveled surfaces carried by said conduit and conforming beveled surfaces carried by said gate body, and resilient means acting parallel to the surface of the gate and normal to its path for pressing the beveled surfaces of said rails carried by said conduit and said conforming beveled surfaces together whereby said gate body is pressed against said substantially flat bottom of said conveyor conduit, certain of the conforming beveled surfaces carried by said gate body being formed upon block elements fixed to said gate body and others of said conforming beveled surfaces being formed upon block elements movably mounted on said gate body, said resilient means comprising springs and being interposed between said block elements fixed to said gate body and said block elements movably mounted upon said gate body.

3. In a vibratory conveyor, in combination, a conveyor conduit, means for vibrating said conveyor conduit in a direction to convey material along said conveyor conduit, said conveyor conduit having a discharge opening therein, a gate body, means for mounting said gate body to be slid into closed, open or partly open position, said means comprising a pair of generally parallel rails carried by said conduit, said rails being spaced from the conduit and extending parallel to the path of the body, shoes having beveled surfaces carried by said gate body and obliquely engaging said rails, and resilient means acting parallel to the surface of the gate and normal to its path for pressing the surfaces of said rails carried by said conduit and said beveled surfaces of said shoes together when said gate body is closed, open or partly open position whereby said gate body in all positions thereof is pressed against said bottom of said conveyor conduit.

4. In a vibratory conveyor, in combination, a conveyor conduit, means for vibrating said conveyor conduit in a direction to convey material along said conveyor conduit, said conveyor conduit having a substantially flat bottom with a discharge opening therein, a flat gate body, means for mounting said gate body to be slid into closed, open or partly open position, said means comprising beveled surfaces carried by said conduit and extending along the path of said body and conforming beveled surfaces carried by said gate body, and resilient means acting parallel to the surface of the gate and normal to its path for pressing the beveled surfaces carried by said conduit and said conforming beveled surfaces together when said gate body is in closed, partly open or open position whereby said gate body in all positions thereof is pressed against said substantially flat bottom of said conveyor conduit.

5. In a vibratory conveyor, in combination, a conveyor conduit, means for vibrating said conveyor conduit in a direction to convey material along said conveyor conduit, said conveyor conduit having a discharge opening therein, a gate body, means for mounting said gate body to be slid into closed, open or partly open position, said means comprising beveled surfaces carried by said conduit in parallel spaced relation and extending along the path of the gate body and conforming beveled surfaces carried by said gate body, and resilient means acting parallel to the surface of the gate and normal to its path for pressing the beveled surfaces carried by said conduit and said conforming beveled surfaces together when said gate body is in closed, partly open or open position whereby said gate body in all positions thereof is pressed against said bottom of said conveyor conduit.

6. In a vibratory conveyor, in combination, a conveyor conduit, means for vibrating said conveyor conduit in a direction to convey material along said conveyor conduit, said conveyor conduit having a substantially flat bottom with a discharge opening therein, a flat gate body, means for mounting said gate body to be slid into opening obstructing position, said means comprising beveled surfaces carried by said conduit and conforming beveled surfaces carried by said gate body, and resilient means acting parallel to the surface of the gate and normal to its path for pressing the beveled surfaces carried by said conduit and said conforming beveled surfaces together whereby said gate body is pressed against said substantially flat bottom of said conveyor conduit, certain of the conforming beveled surfaces carried by said gate body being formed upon block elements fixed to said gate body and others of said conforming beveled surfaces being formed upon block elements movably mounted on said gate body, said resilient means comprising springs and being interposed between said block elements fixed to said gate body and said block elements movably mounted upon said gate body.

7. In a vibratory conveyor, in combination, a conveyor conduit, means for vibrating said conveyor conduit in a direction to convey material along said conveyor conduit, said conveyor conduit having a discharge opening therein, a gate body, means for mounting said gate body to be slid into opening obstructing position, said means comprising a pair of rails having beveled surfaces carried by said conduit and conforming beveled surfaces carried by said gate body, and resilient means acting parallel to the surface of the gate and normal to its path for pressing the beveled surfaces of said rails carried by said conduit and said conforming beveled surfaces together whereby said gate body is pressed against said bottom of said conveyor conduit, certain of the conforming beveled surfaces carried by said gate body being formed upon block elements fixed to said gate body and others of said conforming beveled surfaces being formed upon block elements movably mounted on said gate body, said resilient means comprising springs and being interposed between said block elements fixed to said gate body and said block elements movably mounted upon said gate body.

8. In a vibratory conveyor, in combination, a conveyor conduit, means for vibrating said conveyor conduit in a direction to convey material along said conveyor conduit, said conveyor conduit having a discharge opening therein, a gate body, means for mounting said gate body to be slid into opening obstructing position, said means comprising beveled surfaces carried by said conduit and conforming beveled surfaces carried by said gate body, and resilient means acting parallel to the surface of the gate and normal to its path for pressing the beveled surfaces carried by said conduit and said conforming beveled surfaces together whereby said gate body is pressed against said bottom of said conveyor conduit, certain of the conforming beveled surfaces carried by said gate body being formed upon block elements fixed to said gate body and others of said conforming beveled surfaces being formed upon block elements movably mounted on said gate body, said resilient means comprising springs and being interposed between said block elements fixed to said gate body and said block elements movably mounted upon said gate body.

9. The combination defined in claim 1 in which said resilient means comprises a plurality of upright leaf springs.

References Cited in the file of this patent
UNITED STATES PATENTS

| | | |
|---|---|---|
| 975,240 | Hicks | Nov. 8, 1910 |
| 2,732,170 | Shand | Jan. 24, 1956 |
| 2,733,043 | Smith | Jan. 31, 1956 |
| 2,776,741 | Carrier | Jan. 8, 1957 |